United States Patent
Dziawa et al.

(10) Patent No.: US 6,920,217 B2
(45) Date of Patent: Jul. 19, 2005

(54) METHOD AND APPARATUS FOR TRANSIENT SUPPRESSION IN AN INTEGRATED POTS/DSL LINE CARD

(75) Inventors: Michael Dziawa, Richmond (CA); Scott McClennon, Ottawa (CA); Francois Tremblay, Hull (CA); S. Donald McGinn, Ashton (CA)

(73) Assignee: Ciena Corporation, Linthicum, MD (US)

(*) Notice: Subject to any disclaimer, the term of this patent is extended or adjusted under 35 U.S.C. 154(b) by 400 days.

(21) Appl. No.: 10/278,755

(22) Filed: Oct. 22, 2002

(65) Prior Publication Data

US 2003/0076946 A1 Apr. 24, 2003

(30) Foreign Application Priority Data

Oct. 24, 2001 (CA) .............................................. 2360108

(51) Int. Cl.[7] .............................................. H04M 11/06
(52) U.S. Cl. ............... 379/398; 379/399.01; 379/93.01; 379/93.05
(58) Field of Search ............................ 379/398, 399.01, 379/93.01, 93.05

(56) References Cited

U.S. PATENT DOCUMENTS

| | | | |
|---|---|---|---|
| 6,067,316 A | | 5/2000 | Amrany et al. |
| 6,192,109 B1 | | 2/2001 | Amrany |
| 6,295,343 B1 | | 9/2001 | Hjartarson et al. |
| 6,314,180 B1 | * | 11/2001 | Bingel .......................... 379/398 |
| 6,470,059 B2 | * | 10/2002 | Starr ...................... 379/399.01 |
| 2002/0114444 A1 | * | 8/2002 | Anderson et al. ........... 379/398 |

* cited by examiner

Primary Examiner—Sinh Tran
Assistant Examiner—Daniel Swerdlow
(74) Attorney, Agent, or Firm—Potomac Patent Group PLLC

(57) ABSTRACT

Combined plain old telephone system (POTS) and digital subscriber loop (DSL) line card capable of suppressing low frequency transients. The line card includes the following elements. A DSL receive path receives DSL data from a loop. A POTS receive path receives POTS data from the loop. A combined POTS and DSL transmit path transmits POTS and DSL data to the loop. An impedance generator is coupled between the POTS receive path and the combined POTS and DSL transmit path for synthesizing impedance for signals in the combined POTS and DSL transmit path. A low frequency detector selectively applies a high pass filter to an output of the impedance generator for filtering the low frequency transients. Further, a clipped signal detector and a variable pole high pass filter are provided in the POTS receive path. The clipped signal detector in the POTS receive path triggers a switch that discharges stored transient energy in the receive path. The variable pole high pass filter in the POTS receive path is modified during ringing and hook switch activity, by the line card controller, in order to attenuate transient signals.

29 Claims, 4 Drawing Sheets

METHOD AND APPARATUS FOR TRANSIENT SUPPRESSION IN AN INTEGRATED POTS/DSL LINE CARD

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The invention relates to the field of integrated POTS/DSL line cards, and more specifically to suppression of POTS transients in integrated POTS/DSL line cards.

Traditional deployment of digital subscriber line (DSL) service in addition to existing plain old telephone service (POTS) consists of separate DSL and POTS line cards that are usually housed in separate systems. A line card is typically the first circuit card that a subscriber's twisted pair telephone line encounters when it interfaces with the telephone network at the central office (CO). It is the first point of access for either digital or analog communication over the twisted pair. In order to couple the two services onto the subscriber loop, a POTS splitter is required at both the central office and subscriber locations.

A POTS splitter serves two functions. A first and most obvious function is to separate the low frequency POTS band from a higher frequency DSL band and to present these distinct signals to the respective equipment. A second function is to match the respective POTS and DSL signals to the proper termination impedance. Referring to FIG. 1, a graph illustrates typical voiceband and databand bandwidths for ADSL. The voiceband ranges from 0 to 4 kHz and the databand ranges from 30 kHz to 1.1 MHz. Referring to FIG. 2, a graph illustrates the characteristics of POTS and ADSL (Asymmetric Digital Subscriber Line) loop impedance. As illustrated, the impedance varies from complex in the POTS band to resistive in the ADSL band.

Referring to FIG. 3, a traditional CO splitter placement is illustrated generally by numeral 200. The splitter 210 is connected to the loop 220 and includes a HPF (High-Pass Filter) 230 and a LPF (Low-Pass Filter) 240. An ADSL transceiver 250, including a base-band modem 260 and an AFE (Analog Front End) 270, is connected to the high-pass filter 230. A POTS interface 280, including a CODEC (COder-DECoder) 290 and a SLIC (Subscriber Line Interface Circuit) 295, is connected to the low-pass filter 240. In general, the splitter 210 separates the POTS and ADSL frequency bands so that a common loop may be used.

Disadvantages of this traditional configuration include the need for added equipment, increased physical space requirements, and the cost of the central office POTS splitters. Moreover, deployment of DSL service with existing POTS service typically requires a skilled craftsperson to install and connect the splitter, which results in additional cost to the service provider.

To overcome these problems, integrated POTS/DSL line cards have been proposed. A more complete description of an integrated POTS/DSL line card can be found in U.S. Pat. No. 6,295,343, entitled "Method and Apparatus for Combining Voice Line Card and xDSL Line Card Functions", assigned to the assignee of the present application, and which is hereby incorporated by reference.

However, POTS signaling activities cause transients on the subscriber loop that can interfere with the DSL service that shares the loop. Typically, these transients consist of low frequency noise. POTS signaling activities and associated transients include ringing, ring trip, on-off/off-on hook, and dial pulse. In order to provide ring signaling to the subscriber POTS terminal, a 20 Hz (i.e., in North America), nominal 86 Vrms sine wave is applied to the subscriber loop. Ring trip occurs when the subscriber POTS terminal goes off hook during the time when the ring voltage is applied to the subscriber loop. The sudden change in subscriber terminal impedance as the terminal goes off hook results in a voltage transient at the line card receive interface. Since the subscriber can go off hook during any part of the ring cycle, it is possible to generate large amplitude low frequency transient signals especially when the subscriber set goes off hook at or near the peak of the ring voltage waveform. An on-off/off-on hook, low frequency transient is generated by a change in POTS terminal impedance when the subscriber lifts the handset or replaces it on the receiver. A dial pulse transient is generated by a series of timed hook switch closures used for digit collection at the line card. The transients produced are similar to the on-off hook transients but are periodic in nature.

One disadvantage of known integrated POTS/DSL line cards is that they do not suppress these transients adequately. A need therefore exists for an effective means of suppressing transients caused by POTS signaling activity for integrated POTS/DSL line cards.

Consequently, it is an object of the present invention to obviate or mitigate at least some of the above-mentioned disadvantages.

SUMMARY OF THE INVENTION

In accordance with an aspect of the present invention, there is provided a combined plain old telephone system (POTS) and digital subscriber loop (DSL) line card capable of suppressing low frequency transients. The line card comprises the following. A DSL receive path receives DSL data from a loop. A POTS receive path receives POTS data from the loop. A combined POTS and DSL transmit path transmits POTS and DSL data to the loop. An impedance generator is coupled between the POTS receive path and the combined POTS and DSL transmit path for synthesizing impedance for signals in the combined POTS and DSL transmit path. A low frequency signal detector selectively applies a high pass filter to an output of the impedance generator for filtering the low frequency transients.

In accordance with further aspects of the present invention there are provided a clipped signal detector and a variable pole high pass filter in the POTS receive path. The clipped signal detector in the POTS receive path triggers a switch that discharges stored transient energy in the receive path. The variable pole high pass filter in the POTS receive path is modified during ringing and hook switch activity, by the line card controller, in order to attenuate transient signals.

BRIEF DESCRIPTION OF THE DRAWINGS

An embodiment of the present invention will now be described by way of example only, with reference to the following drawings in which.

DETAILED DESCRIPTION OF THE INVENTION

Figure 1:
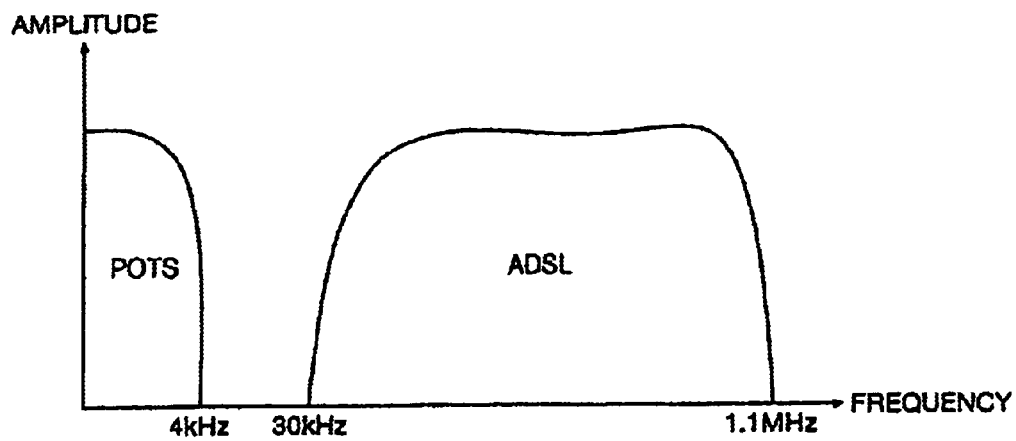
FIG. 1 is a graph illustrating the POTS and ADSL frequency bands (prior art)

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. In the description, like numerals refer to like structures in the drawings.

In general, transient suppression involves the use of filter additions, filter changes, and gain changes in the receive signal path of the central office (CO) line card to minimize the impact on the DSL service, in terms of data loss, caused by POTS signaling activity. An integrated POTS/DSL line card is provided with the capability for suppression of POTS signaling-induced transients. This integrated line card uses digital signal processing to synthesize the distinct characteristic impedance for the POTS and DSL frequency bands. The impedance synthesis function relies upon linear characteristics of a current-sensed POTS signal to function properly. However, POTS signaling transients such as hook switch activity, ringing, and ring trip can generate low frequency signals of sufficient amplitude to cause signal clipping and affective muting of the impedance synthesis function. This results in incorrect loop termination and signal degradation.

The effects on DSL service include data loss and, in severe cases, retraining of the DSL link. The effect of muting the impedance synthesis function is that the DSL equalization, which is adaptively determined during steady state operation, is no longer valid. This results in data loss or retraining of the DSL service. Retraining occurs when the DSL modems adaptive equalizer is not able to recover from the transient effects. Suppression of the various POTS signaling-induced transients listed above is described in the following.

Figure 4:
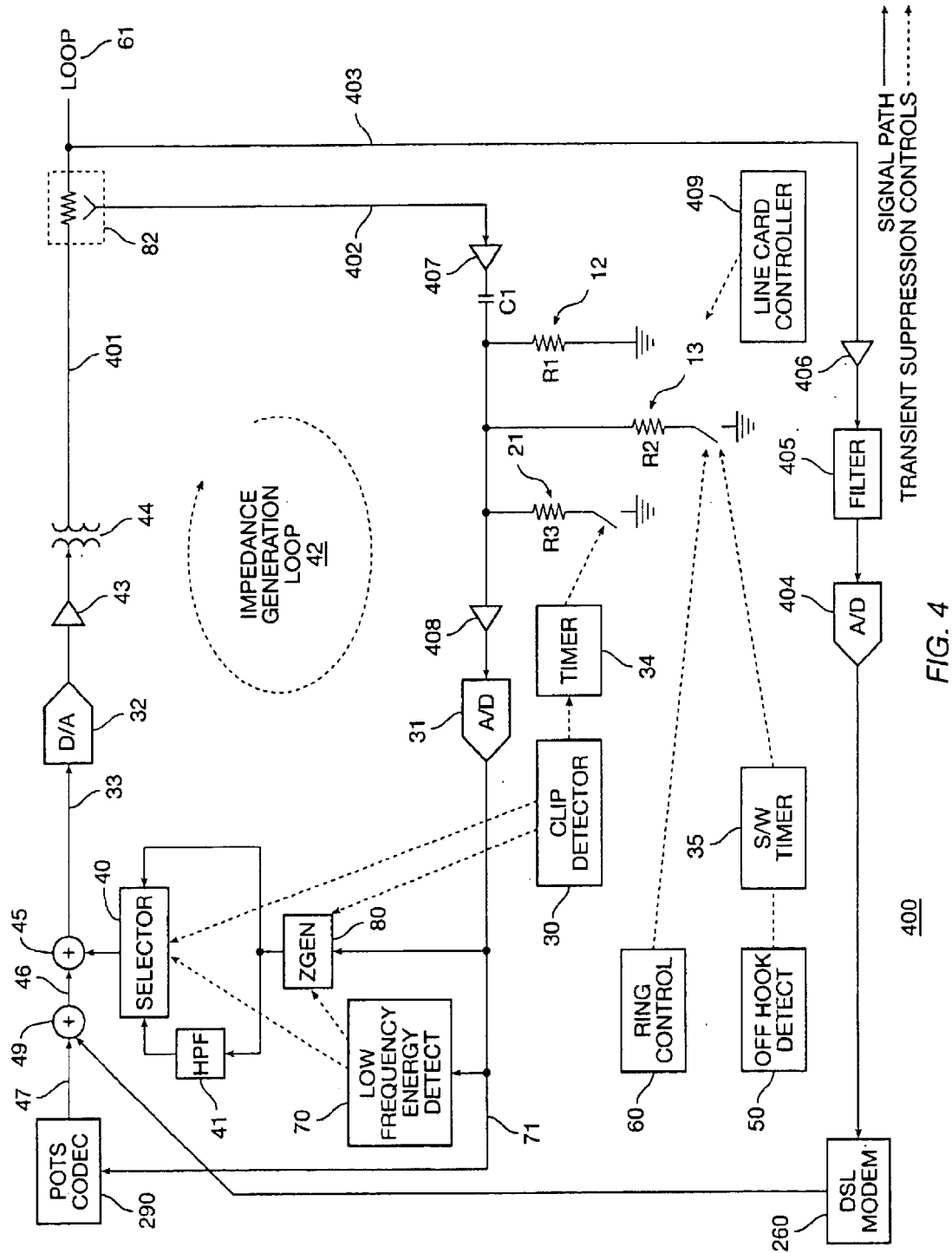
FIG. 4 is a block diagram illustrating an integrated POTS/DSL line card with POTS signaling induced transient suppression.

Referring to FIG. 4, an integrated POTS/DSL line card with POTS is illustrated generally by numeral 400. The integrated line card 400 provides signaling-induced transient suppression in accordance with an embodiment of the invention. In FIG. 4, control paths are shown as dashed lines, and signal paths are shown as solid lines. The line card 400 includes a line card controller 409, an impedance generator (Zgen) 80, a 285 Hz high pass filter 13, a discharger 21, a clipping detector 30, a 300 Hz selectable high pass filter 41, an on/off hook detector 50, a line card ringing controller 60, a low frequency energy detector 70, a combined POTS/DSL transmit path 401, a POTS receive path 402, a DSL receive path 403, an impedance generation loop 42, a POTS CODEC 290, and a DSL modem 260. The signal paths and control paths can be implemented in either hardware, software (DSP code), or a combination of both.

The POTS CODEC 290 and the DSL modem 260 are coupled to the loop 61 via the combined POTS/DSL transmit path 401 for combined POTS/DSL transmission. The combined POTS/DSL transmit path 401 is coupled to the loop 61 via a line transformer 44 and a current sense bridge 82. The loop 61 is coupled with the DSL modem 260 via the DSL receive path 403 for databand reception. The DSL receive path 403 is coupled directly to the loop 61. The loop 61 is coupled to the POTS CODEC 290 via the POTS receive path 402 for voiceband reception. The POTS receive path 402 is coupled to the loop 61 via the current sense bridge 82. Data sensed from the POTS receive path 402 is further used by the impedance generator 80 for matching impedance to the ideal impedance illustrated in FIG. 2. Impedance matching is known in the art and thus, will not be described in detail.

The DSL receive path 403 includes an amplifier 406, a filter 405, an analog-to-digital (A/D) converter 404, and the DSL modem 260. The POTS receive path 402 includes a first amplifier 407, a 26 Hz high pass filter 12, the 285 Hz high pass filter 13, the discharger 21, a second amplifier 408, an A/D converter 31, and the POTS CODEC 290. The 26 Hz high-pass filter 12 comprises a resistor R1 and a capacitor C1. The 285 Hz high pass filter 13 comprises the resistor R1 coupled in parallel to a resistor R2 and the capacitor C1. The combined POTS/DSL transmit path 401 includes a first adder 49, a second adder 45, a digital-to-analog (D/A) converter 32, a driver 43, the line transformer 44, and the current sense bridge 82. The first adder 49 adds the output from the DSL modem 260 with the output from the POTS CODEC 290. The second adder 45 adds the output from the impedance generator 80 to the output from the first adder 49. The current sense bridge 82 (which also may be referred to as a current sense resistor network) allows for current sense of the POTS band signals on the loop.

The impedance generation loop 42 includes a part of the POTS receive path 402. Specifically, it includes the first amplifier 407, the POTS current sense bridge 82, the 285 Hz high pass filter 13, the discharger 21, the second amplifier 408, the A/D converter 31, the impedance generator 80, and the 300 Hz high pass filter 41. Associated with the impedance generation loop 42 is the clipping detector 30, the on/off hook detector 50, the line card ringing controller 60, and the low frequency energy detector 70.

The line card controller 409 includes a digital signal processor, a microprocessor, and memory. The line card controller 409 has stored therein data representing sequences of instructions which when executed, cause the method described herein to be performed. The line card controller 409 may contain additional software and hardware for which a description is not required for understanding the invention.

The impedance generator 80 synthesizes a frequency-dependent input impedance of the line card 400 using the feedback loop 42, which feeds the current sensed on the loop 61 back into the line driver 43. The impedance generator 80 includes a digital signal processor, which implements multiple gain and filter stages required to synthesize an impedance transfer function.

During sensed transient signal conditions, the transfer function characteristic is modified by the impedance generator 80 to decrease the low frequency gain to minimize the transient signal level applied to the driver 43. Further, a selector 40 is used to apply the 300 Hz filter 41 to the output of the impedance generator 80, which is enabled by the low frequency energy detector, as will be described in detail below.

Figure 2:
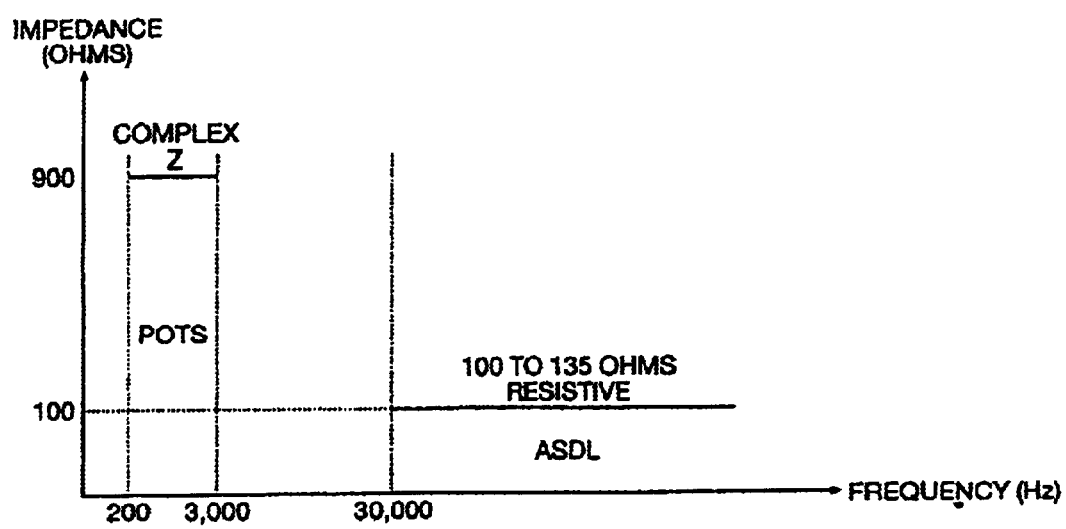
FIG. 2 is a graph illustrating the characteristics of POTS and ADSL loop impedance (prior art)
Figure 3:
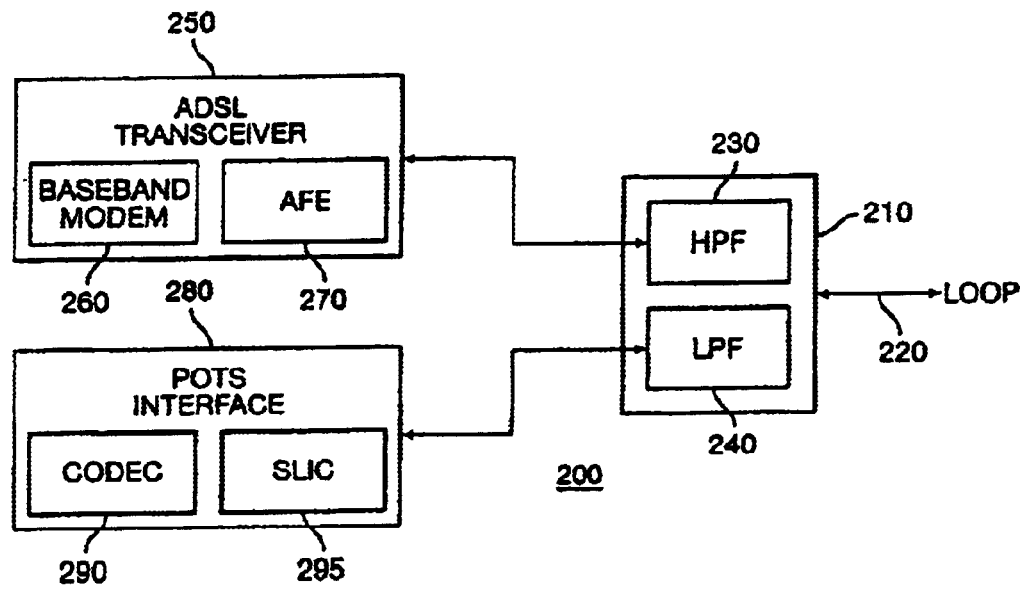
FIG. 3 is a block diagram illustrating traditional CO splitter placement (prior art)

Under normal conditions, the ideal transfer function characteristic is similar to that illustrated in FIG. 2. The impedance generator 80 compares the current loop impedance characteristic to the ideal characteristic and adjusts the transfer function accordingly. The transfer function of the impedance generator 80 is a constant and the variable is the sensed loop current. The output of the impedance generator 80 is fed back into the loop through the adder 45 where it is mixed with the outgoing combined POTS/DSL signal 46. If the output of the impedance generator 80 is lost due to transient signal levels exceeding the dynamic range of the circuit, the feedback path 42 is disrupted and hence the input impedance of the line card 400 deviates from the correct value. The adaptive equalizer of the DSL modem 260 attempts to correct for the deviation, but there is a limit to its capability. It is therefore important to minimize the duration and extent of the transient disruption to the impedance synthesis function.

As previously mentioned, POTS signaling transients such as hook switch activity, ringing, and ring trip can generate low frequency signals of sufficient amplitude to cause signal clipping in the analog-to-digital (A/D) converter 31 and the affective muting of the impedance generator 80. This results in incorrect loop termination and signal degradation. That is, low frequency noise that is not suppressed causes saturation of the A/D converter 31, which hampers the operation of the impedance generator 80. Normally, the impedance generator 80 operates linearly, taking values from the A/D converter 31, and it relies on a linear representation of the signal on the loop. When excessive low frequency noise is input to the A/D converter 31, saturation of the A/D converter 31 occurs. This is referred to as "clipping". The output of the A/D converter 31 goes to its maximum value or "rail". This results in a loss of representation of the signal on the loop and hence the impedance generator 80 cannot correctly operate to set the input impedance of the line card 400. The effect on DSL service includes data loss and, in severe cases, retraining of the DSL link. Moreover, as the impedance generator 80 includes gain stages, a near-rail output from the A/D converter 31 may be railed within the impedance generator 80 itself, causing the same detrimental effects. To avoid these detrimental effects, the duration and/or levels of low frequency transients are reduced through high pass filtering.

The 285 Hz high-pass filter 13 is enabled by connecting the resistor R2 to ground. When the 285 Hz high pass filter 13 is enabled, the high pass pole frequency of the POTS receive path filter is moved from approximately 26 Hz to approximately 285 Hz by the addition of the shunt resistor R2. This provides increased attenuation of low frequency transient energy received in the POTS receive path 402.

The discharger 21 is enabled by connecting the resistor R3 to ground. When the discharger 21 is enabled, a fast discharge path is provided for transient energy stored in the POTS receive path high pass filter, thereby restoring the low frequency blocking effect of the filter, once the discharger is disabled. Enabling the discharger effectively mutes the POTS receive path 402 and the operation of the impedance generator 80, resulting in loss of impedance synthesis for the duration it is enabled. When the discharger 21 is enabled and the resistor R3 is connected to ground, the characteristic of the POTS receive path filter 12 is changed and the POTS receive path gain is reduced to near zero. Further, the duration of low frequency transients is reduced by discharging the transient energy stored in the capacitor C1. The addition of the resistor R3 to the POTS receive path filter 12 converts it to a 1 kHz high-pass filter, which effectively attenuates ringing signaling and hook switch activity transient signals.

In terms of POTS, enabling the discharger 21 has little to no detrimental effects, as the POTS function is already in a transient state and is not expected to pass parametric tests. DSL service, however, is affected for the duration of the application of the discharger 21 due to the change in line card impedance resulting in improper DSL upstream receiver equalization. For this reason, the application of the discharger 21 is limited to approximately 200 microseconds, which is less than one DSL symbol period (approximately 250 microseconds). This minimizes the duration of the impedance mismatch, resulting in minimum loss of DSL data. In the worst case, a single DSL symbol may be lost.

The clipping detector 30 detects saturation due to transient conditions at the output 71 of the POTS receive path A/D converter 31. The clipping detector 30 is implemented in hardware and when triggered acts directly to invoke the discharger 21 with minimum delay. The clipping detector 30 includes a timer 34. The output of the clipping detector 30 also activates the 300 Hz high-pass filter 41 and provides adjustment inputs to the impedance generator 80.

The 300 Hz high pass filter 41 is used to generate the input impedance of the line card 400. This limits the low frequency signal applied to the line driver 43, thus reducing the transient signal level applied to the line driver 43 and the line transformer 44.

The on-off/off-on hook detector 50 triggers transient suppression activity when a hook switch transition is detected. The on-off/off-on hook detector 50 includes a timer 35. When an on-off/off-on hook condition is detected, the 285 Hz high pass filter 13 is enabled, and the resistor R2 is connected to ground for a period of approximately 30 milliseconds. On-hook to off-hook transitions are detected by an increase in current in the loop by known methods. Off-hook to on-hook transitions are detected by a decrease in current in the loop by known methods.

The line card ringing controller 60 is used to apply the 20 Hz POTS ringing signal to the loop 61. The line card ringing controller 60 also activates the 285 Hz high pass filter 13 in the POTS receive path 402 when the ringing signal is applied.

The low frequency energy detector 70 samples the output of the POTS receive path signal 71 to determine the low frequency energy level of the signal. This low frequency energy level is compared to predetermined thresholds. The signal applied to the low frequency energy detector 70 is filtered by a 30 Hz corner frequency, low pass filter that allows the thresholds to be sensitized to transient signal frequencies below the POTS frequency band. This filter characteristic prevents the detector from triggering on normal POTS signal levels. If a predetermined upper threshold is passed, the low frequency energy detector 70 provides a signal to activate the 300 Hz high pass filter 41. The 300 Hz high pass filter 41 is deactivated when the low frequency energy level drops below a predetermined lower threshold. High levels of low frequency energy indicate that a low frequency transient problem may exist. The low frequency energy detector 70 activates the 300 Hz high pass filter 41 and/or provides adjustment inputs to the impedance generator 80 such that the low frequency gain of the impedance generator 80 is reduced.

Figure 5:
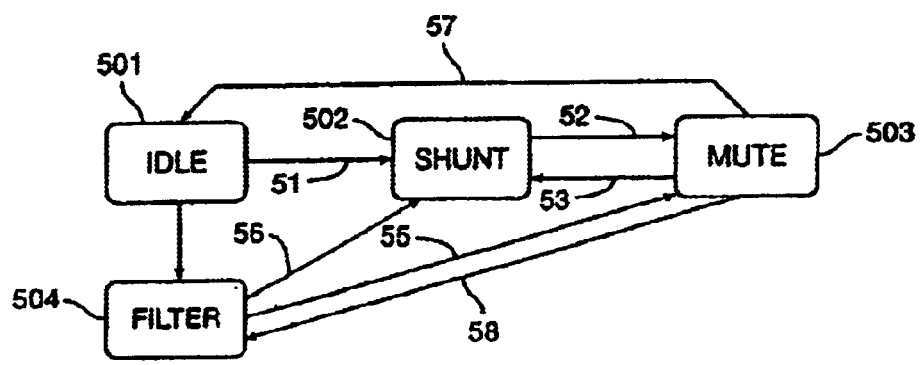
FIG. 5 is a transient suppression state diagram.

Referring to FIG. 5, there is shown a transient suppression state diagram in accordance with an embodiment of the invention. The state diagram indicates responses by the line card 400 to transient signals on the subscriber loop. In addition to the responses indicated in the state diagram, additional preventative measures are invoked by the line card controller 409 in response to ringing application and hook switch status change detection. These preventative measures are described as follows.

The 285 Hz receive path high pass filter 13 is invoked for the duration of the ringing signal to provide additional attenuation of the 20 Hz signal. Both the application of the ringing signal and the enabling of the 285 Hz filter 13 are performed by the line card ringing controller 60 in response to signaling from the Public Switched Telephone Network (PSTN).

Further, the 285 Hz receive path high pass filter 13 is invoked for a fixed time period if there is a change detected in the hook status. This attenuates transient signals caused by the hook switch activity. The fixed time period is determined by the timer 35. As previously mentioned, the preferred period for activation of the 285 Hz high pass filter is approximately 30 milliseconds. Detection of hook switch status changes is performed by the on-off/off-on hook detector 50.

The transient suppression state diagram includes four states: IDLE 501, SHUNT 502, MUTE 503, and FILTER 504. These states are described as follows.

In the IDLE state 501, there is no transient suppression activity and, as such, it represents normal line card operation.

In the SHUNT state 502, the 300 Hz high-pass filter 41 in the impedance generation path 42 and low frequency gain reduction in the impedance generator 80 are activated for a period of 1 millisecond. The SHUNT state 502 is entered when the clipping detector 30 detects signal clipping in the POTS A/D converter 31. The discharger 21 is activated by the clip detector 30 and lasts for a period of approximately 200 microseconds. The discharger 21 is part of the SHUNT state 502 and is controlled by an autonomous 200 microsecond hardware timer. The duration of the application of the discharger is purposely limited to less than the duration of one symbol period of the DSL signal, which is approximately 250 microseconds, for reasons described previously.

In the MUTE state 503, the 300 Hz high-pass filter 41 in the impedance generation path 42 and low frequency gain reduction in the impedance generator 80 is activated for a period of 300 milliseconds. This state is always applied following the SHUNT state 502 in order to provide additional settling time following the release of the discharger 21.

In the FILTER state 504, the 300 Hz high-pass filter 41 in the impedance generation path 42 and low frequency gain reduction in the impedance generator 80 are activated while the low frequency energy detector 70 is in the triggered state. The triggered state is the state when the transient signal level detected by the low frequency energy detector is above the lower threshold, having previously surpassed the upper threshold.

The transient suppression state diagram includes eight state transitions: IDLE to SHUNT 51, SHUNT to MUTE 52, MUTE to SHUNT 53, IDLE to FILTER 54, FILTER to SHUNT 56, FILTER to MUTE 55, MUTE to FILTER 58, and MUTE to IDLE 57. These transitions may be described as follows.

The IDLE to SHUNT transition 51 is activated if saturation is indicated by the clipping detector 30.

The SHUNT to MUTE transition 52 is automatic following the SHUNT 502 state.

The MUTE to SHUNT transition 53 is activated if saturation is indicated by the clipping detector 30 while in the MUTE state 503 delay timeout (i.e. approximately 300 milliseconds).

The IDLE to FILTER transition 54 is activated when the trigger, or upper, threshold of the low frequency energy detector 70 is crossed; that is, as transient energy level increases.

The FILTER to MUTE transition 55 is activated when the release, or lower, threshold of the low frequency energy detector 70 is crossed; that is, as transient energy level decrease and the clipping detector 30 is not triggered.

The MUTE to FILTER transition 58 is activated when the trigger threshold of the low frequency energy detector 70 is crossed while in the MUTE state 503.

The FILTER to SHUNT transition 56 is activated when the release threshold of the low frequency energy detector 70 is crossed and the clipping detector 30 is triggered.

The MUTE to IDLE transition 57 is activated if saturation is not indicated by the clipping detector 30 following the MUTE state 502 delay timeout, which is approximately 300 milliseconds, and the upper threshold has not been crossed.

State transitions thus occur in accordance with transient-producing activity in the loop, including on-off hook, ringing, ring trip, dialing, or combinations thereof.

Thus, the line card and described herein provides several advantages over the prior art. POTS transient suppression functions are provided on a splitterless voice and DSL line card at a central office or digital loop carrier (DLC). Low frequency signals are inhibited from being coupled to a line transformer via an impedance generation feedback path. Low frequency transients in an impedance generator network are suppressed without changing the line interface impedance in the DSL frequency band. An increased rejection of ringing signal frequencies at the impedance generator input is provided without changing the line interface impedance in the DSL frequency band. Detection of low frequency transients and quick charging DC blocking capacitors is provided for removing low frequency energy.

Figure 6:
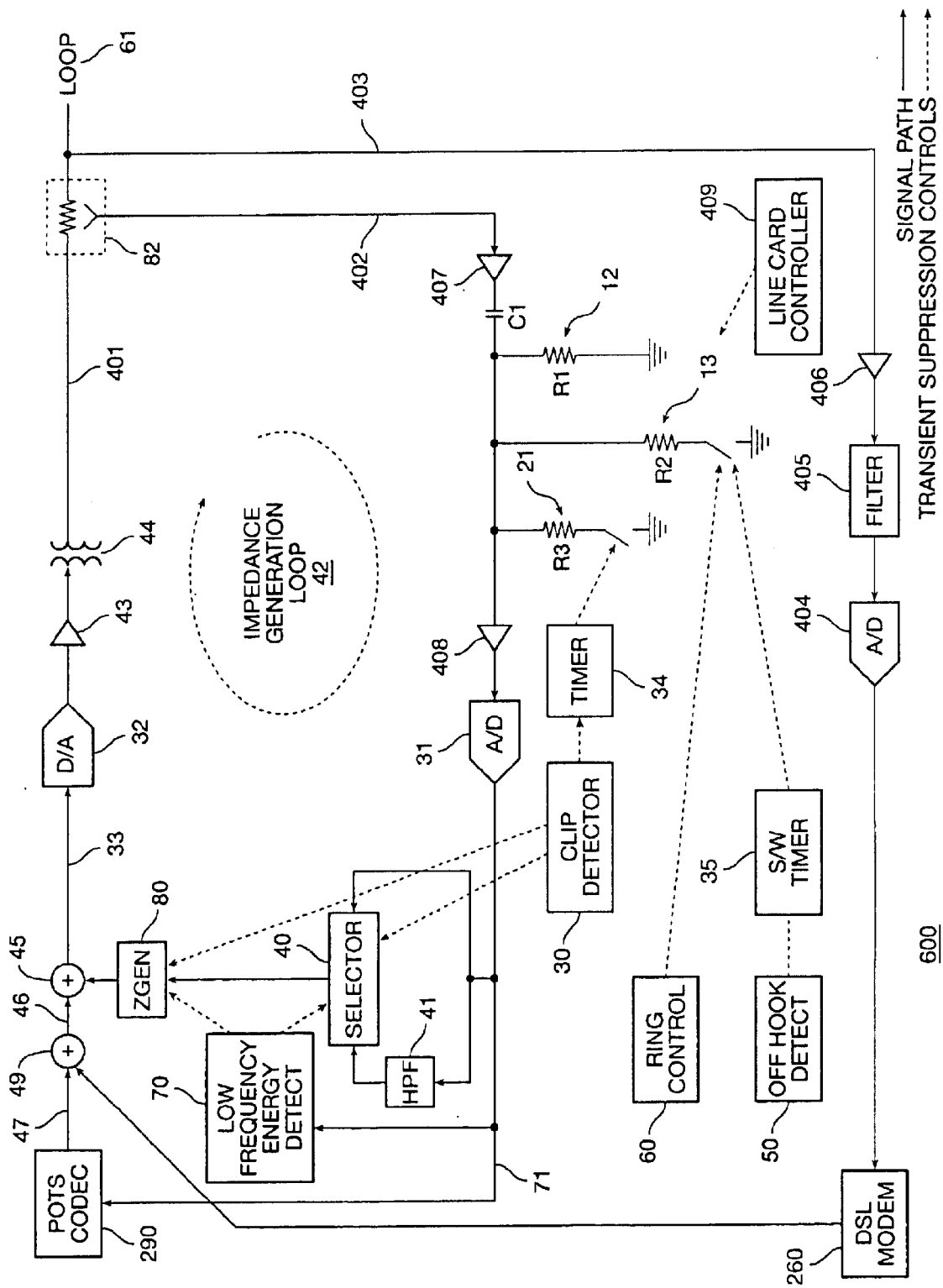
FIG. 6 is a block diagram of alternate embodiment of the integrated POTS/DSL line card illustrated in FIG. 4.

Referring to FIG. 6, an alternate embodiment is illustrated generally by numeral 600. The present embodiment is similar to that described with reference to FIG. 4, with the exception that the order of the 300 Hz high pass filter 41 and the impedance generator 80 are reversed. The embodiment illustrated in FIG. 6 has been shown to improve effectiveness of the overall transient suppression algorithm.

Although the invention has been described with reference to certain specific embodiments, various modifications thereof will be apparent to those skilled in the art without departing from the spirit and scope of the invention as outlined in the claims appended hereto.

What is claimed is:

1. A combined plain old telephone system (POTS) and digital subscriber loop (DSL) line card capable of suppressing low frequency transients, said line card comprising:

a DSL receive path that receives DSL data from a loop;

a POTS receive path that receives POTS data from said loop;

a combined POTS and DSL transmit path that transmits POTS and DSL data to said loop;

an impedance generator, coupled between said POTS receive path and said combined POTS and DSL transmit path, that synthesizes impedance for signals in said combined POTS and DSL transmit path; and a low frequency signal detector that detects low frequency transients in said POTS receive path and that selectively applies a high pass filter coupled with said impedance generator for filtering said low frequency transients.

2. A line card as defined in claim 1, wherein said low frequency signal detector further reduces a gain applied by said impedance generator.

3. A line card as defined in claim 1, further comprising:
a clip detector that selectively applies said high pass filter for filtering said low frequency transients.

4. A line card as defined in claim 3, wherein said clip detector further reduces a gain applied by said impedance generator.

5. A line card as defined in claim 4, wherein said high pass filter and said gain reduction is applied to said impedance generator for approximately one millisecond.

6. A line card as defined in claim 3, wherein said clip detector further applies a discharger for discharging transient energy stored in said POTS receive path.

7. A line card as defined in claim 6, wherein said discharger is applied for approximately 200 microseconds.

8. A line card as defined in claim 3, wherein said clip detector is applied in response to signal clipping by an analog-to-digital converter in said POTS receive path.

9. A line card as defined in claim 1, wherein said low frequency detector applies said high pass filter when said low frequency transients in said POTS receive path exceed a trigger threshold.

10. A line card as defined in claim 9, wherein said low frequency detector stops applying said high pass filter when said low frequency transients in said POTS receive path fall below a release threshold.

11. A line card as defined in claim 1, further including:
a ring controller that applies a ringing signal to said loop, said ring controller further enabling a high pass ring signal filter.

12. A line card as defined in claim 11, wherein said high pass ring signal filter is enabled for a duration of said ringing signal.

13. A line card as defined in claim 11, wherein said high pass ring signal filter is a 285 Hz filter.

14. A line card as defined in claim 1, further comprising:
a hook detector that detects a change in hook condition at a receiver, said hook detector further enabling a high pass hook switch filter.

15. A line card as defined in claim 14, wherein said hook detector further includes:
a timer that limits a duration for which said high pass hook switch filter is enabled.

16. A line card as defined in claim 14, wherein said high pass hook switch filter is a 285 Hz filter.

17. A line card as defined in claim 1, further comprising:
a variable pole high pass filter in said POTS receive path, said variable pole high pass filter having a predefined high pass pole for normal operation and at least a second high pass pole for transient suppression.

18. A line card as defined in claim 1, wherein said high pass filter is coupled between said impedance generator and said combined POTS and DSL transmit path.

19. A line card as defined in claim 1, wherein said high pass filter is coupled between said impedance generator and said POTS receive path.

20. A method of suppressing low frequency transients in a combined plain old telephone system (POTS) and digital subscriber loop (DSL) line card, wherein an impedance is generated in accordance with a signal on a POTS receive path, said method comprising the steps of:
detecting when said low frequency transients in said POTS receive path exceed a trigger threshold; and
applying a high pass filter to said impedance for reducing an effect of said low frequency transients when said low frequency transients are detected.

21. A method as defined in claim 20, further including the step of:
reducing a gain for generating said impedance, thereby reducing a sensitivity to said low frequency transients.

22. A method as defined in claim 20, further including the step of:
detecting signal clipping in an analog-to-digital converter in said POTS receive path for applying said high pass filter.

23. A method as defined in claim 22, further including the step of:
discharging transient energy stored in said POTS receive path in response to detecting said signal clipping.

24. A method as defined in claim 23, wherein said transient energy is discharged for a period of approximately 200 microseconds.

25. A method as defined in claim 23, further including the step of:
reducing a gain for generating said impedance in response to detecting said signal clipping, thereby reducing sensitivity to said low frequency transients.

26. A method as defined in claim 20, further including the step of:
applying a high pass ring signal filter when a ringing signal is applied to a loop.

27. A method as defined in claim 26, wherein said high pass ring signal filter is applied for a duration of said ringing signal.

28. A method as defined in claim 20, further including the step of:
applying a high pass hook switch filter when a change in hook status is detected.

29. A method as defined in claim 28, wherein said high pass hook switch filter is applied for approximately 30 milliseconds.

* * * * *